(12) United States Patent
Tanaka

(10) Patent No.: US 10,672,146 B2
(45) Date of Patent: Jun. 2, 2020

(54) CALIBRATION APPARATUS FOR ONBOARD CAMERA AND CALIBRATION METHOD FOR ONBOARD CAMERA

(71) Applicant: DENSO CORPORATION, Kariya, Aichi-pref. (JP)

(72) Inventor: Hitoshi Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/342,123

(22) PCT Filed: Oct. 11, 2017

(86) PCT No.: PCT/JP2017/036827
§ 371 (c)(1),
(2) Date: Apr. 15, 2019

(87) PCT Pub. No.: WO2018/074302
PCT Pub. Date: Apr. 26, 2018

(65) Prior Publication Data
US 2019/0259180 A1 Aug. 22, 2019

(30) Foreign Application Priority Data
Oct. 17, 2016 (JP) .................... 2016-203640

(51) Int. Cl.
*G06T 7/80* (2017.01)
*G01B 11/26* (2006.01)
(Continued)

(52) U.S. Cl.
CPC ............ *G06T 7/80* (2017.01); *B60R 1/00* (2013.01); *G01B 11/26* (2013.01); *G06T 1/00* (2013.01);
(Continued)

(58) Field of Classification Search
CPC ..... G06T 7/80; G06T 1/00; B60R 1/00; H04N 5/225; H04N 7/18; H04N 17/00; H04N 17/002; G01B 11/26
See application file for complete search history.

(56) References Cited

U.S. PATENT DOCUMENTS 9,883,145 B2 * 1/2018 Kawai ...................... H04N 7/18
10,171,802 B2 * 1/2019 Tanaka ...................... B60R 1/00
(Continued)

FOREIGN PATENT DOCUMENTS

JP 4555876 B2 10/2010

*Primary Examiner* — Mishawn N. Hunter
(74) *Attorney, Agent, or Firm* — Knobbe, Martens, Olson & Bear, LLP

(57) ABSTRACT

A calibration apparatus for an onboard camera includes an image acquiring unit, a marker recognizing unit, a movement distance calculating unit, an image storage unit, and a calibration unit. The movement distance calculating unit calculates a movement distance of a vehicle based on a number of times that a process in which a first feature portion in a marker moves to a position overlapping a second feature position in the marker in the image is repeated. The image storage unit stores a specific image that includes the marker. The calibration unit calibrates the onboard camera using the specific image. The image storage unit stores, as the specific image, (a) the image in which the marker is recognized, and (b) the image acquired when the movement distance from a position of the vehicle when the specific image has been acquired in the past reaches a predetermined distance.

6 Claims, 16 Drawing Sheets

(51) Int. Cl.
  *G06T 1/00* (2006.01)
  *H04N 5/225* (2006.01)
  *H04N 7/18* (2006.01)
  *H04N 17/00* (2006.01)
  *B60R 1/00* (2006.01)
  *G06T 7/00* (2017.01)

(52) U.S. Cl.
  CPC ............ *G06T 1/0007* (2013.01); *H04N 5/225* (2013.01); *H04N 7/18* (2013.01); *H04N 17/00* (2013.01); *H04N 17/002* (2013.01); *G06T 7/00* (2013.01); *G06T 2207/30204* (2013.01); *G06T 2207/30252* (2013.01)

(56) References Cited

U.S. PATENT DOCUMENTS

| | | | |
|---|---|---|---|
| 10,176,594 B2 * | 1/2019 | Tanaka | B60R 1/00 |
| 10,358,086 B2 * | 7/2019 | Tanaka | G06T 7/80 |
| 2009/0299684 A1 | 12/2009 | Imanishi et al. | |
| 2013/0135474 A1 * | 5/2013 | Sakano | G06K 9/00791 |
| | | | 348/148 |
| 2014/0043473 A1 * | 2/2014 | Gupta | H04N 17/00 |
| | | | 348/135 |
| 2015/0049193 A1 * | 2/2015 | Gupta | G03B 43/00 |
| | | | 348/148 |

* cited by examiner

CALIBRATION APPARATUS FOR ONBOARD CAMERA AND CALIBRATION METHOD FOR ONBOARD CAMERA

CROSS-REFERENCE TO RELATED APPLICATIONS

The present application is a national stage application of PCT Application No. PCT/JP2017/036827, filed on Oct. 11, 2017, which claims the benefit of priority based on Japanese Patent Application No. 2016-203640, filed on Oct. 17, 2016 to the Japan Patent Office, the descriptions of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a calibration apparatus for an onboard camera and a calibration method for an onboard camera.

BACKGROUND ART

Conventionally, a method in which an image of a marker that is provided on a floor surface is captured through use of an onboard camera, and an attitude or the like of the onboard camera is calibrated through use of the acquired image is known. As such a calibration method, there is a method disclosed in PTL 1.

CITATION LIST

Patent Literature

[PTL 1] Japanese Patent Publication No. 4555876

SUMMARY OF INVENTION

A following issue has been found as a result of detailed study by the inventors. In the calibration method for an onboard camera disclosed in PTL 1, a marker is required to be provided for an imaging area of each camera. Therefore, a large space is required for calibration to be performed. Furthermore, a significant amount of labor is required for numerous markers to be provided.

According to an aspect of the present disclosure, a calibration apparatus for an onboard camera that is capable of reducing a number of markers provided on a floor surface and a calibration method for an onboard camera are preferably provided.

An aspect of the present disclosure is a calibration apparatus for an onboard camera that includes: an image acquiring unit that acquires an image using an onboard camera that is mounted to a vehicle; a marker recognizing unit that recognizes a marker that is provided on a floor surface in the image acquired by the image acquiring unit; a movement distance calculating unit that calculates a movement distance of the vehicle based on a number of times that a process in which a first feature portion in the marker moves to a position overlapping a second feature portion in the marker in the image acquired by the image acquiring unit in accompaniment with movement of the vehicle in a fixed direction is repeated; an image storage unit that stores a specific image that includes the marker, among the images acquired by the image acquiring unit; and a calibration unit that calibrates the onboard camera using the specific image stored by the image storage unit.

The image storage unit is configured to store, as the specific image, (a) the image in which the marker recognizing unit recognizes the marker, and (b) the image acquired when the movement distance calculated by the movement distance calculating unit from a position of the vehicle when the specific image has been acquired in the past reaches a predetermined distance.

The calibration apparatus for an onboard camera according to an aspect of the present disclosure also stores, as the specific image, the image acquired when the position of the vehicle when the specific image has been acquired in the past moves by the predetermined distance.

Therefore, a plurality of specific images in which a relative position of the marker from the perspective of the vehicle each differs can be stored for a single marker. In addition, calibration of the onboard camera can be performed using the plurality of specific images. As a result, the number of markers provided on the floor surface in advance can be suppressed.

In addition, the calibration apparatus for an onboard camera according to an aspect of the present disclosure calculates the movement distance of the vehicle based on the number of times that the process in which the first feature portion in the marker moves to a position overlapping the second feature portion in the marker in the acquired image in accompaniment with the movement of the vehicle in a fixed direction is repeated. Therefore, the movement distance of the vehicle from when a specific image is acquired until the next specific image is acquired can be accurately measured. As a result, the distance between the same markers imaged at differing times in the specific images can be accurately calculated. Consequently, calibration based on the specific image can be performed with further accuracy.

Another aspect of the present disclosure is a calibration method for an onboard camera in which: an image is acquired using an onboard camera that is mounted to a vehicle; a marker that is provided on a floor surface in the acquired image is recognized; a movement distance of the vehicle is calculated based on a number of times that a process in which a first feature portion in the marker moves to a position overlapping a second feature portion in the marker in the acquired image in accompaniment with movement of the vehicle in a fixed direction is repeated; a specific image that includes the marker, among the acquired images, is stored; and the onboard camera is calibrated using the stored specific image. The specific image includes (a) the image in which the marker is recognized, and (b) the image acquired when the movement distance from a position of the vehicle when the specific image has been acquired in the past reaches a predetermined distance.

The calibration method for an onboard camera according to another aspect of the present disclosure also stores, as the specific image, the image acquired when the position of the vehicle when the specific image has been acquired in the past moves by the predetermined distance.

Therefore, a plurality of specific images in which a relative position of the marker from the perspective of the vehicle each differs can be stored for a single marker. In addition, calibration of the onboard camera can be performed using the plurality of specific images. As a result, the number of markers provided on the floor surface in advance can be suppressed.

Furthermore, in the calibration method according to another aspect of the present disclosure, the movement distance of the vehicle is calculated based on the number of times that the process in which the first feature portion in the marker moves to a position overlapping the second feature portion in the marker in the acquired image in accompaniment with the movement of the vehicle in a fixed direction is repeated. Therefore, the movement distance of the vehicle from when a specific image is acquired until the next specific image is acquired can be accurately measured. As a result, the distance between the same markers imaged at differing times in the specific images can be accurately calculated. Consequently, calibration based on the specific image can be performed with further accuracy.

Reference numbers within the parentheses in the claims indicate corresponding relationships with specific means described according to an embodiment, described below as an aspect, and do not limit the technical scope of the present disclosure.

DESCRIPTION OF EMBODIMENTS

An embodiment of the present disclosure will hereinafter be described with reference to the drawings.

First Embodiment

1. Configuration of a Calibration Apparatus 1

A configuration a calibration apparatus 1 will be described with reference to FIG. 1 to FIG. 3. The calibration apparatus 1 is an apparatus that performs calibration of an onboard camera. A vehicle in which the onboard camera is mounted is hereinafter referred to as an own vehicle. The calibration apparatus 1 may be mounted in the own vehicle. Alternatively, the calibration apparatus 1 may be set in a location other than the own vehicle.

Figure 1:
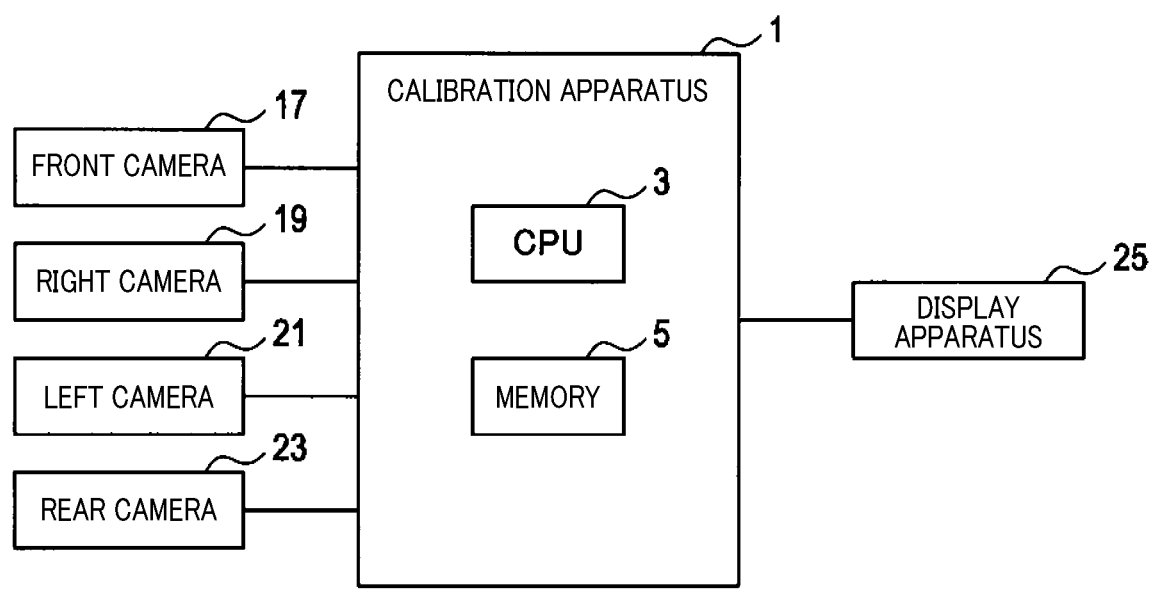
FIG. 1 is a block diagram of a configuration of a calibration apparatus.

As shown in FIG. 1, the calibration apparatus 1 is mainly configured by a known microcomputer that includes a central processing unit (CPU) 3, a random access memory (RAM), a read-only memory (ROM), and a semiconductor memory (hereinafter referred to as a memory 5) such as a flash memory. Various functions of the calibration apparatus 1 are actualized by the CPU 3 running a program that is stored in a non-transitory computer-readable storage medium. In this example, the memory 5 corresponds to the non-transitory computer-readable storage medium in which the program is stored. In addition, as a result of the program being run, a method corresponding to the program is performed. Here, the calibration apparatus 1 may be configured by one or a plurality of microcomputers.

Figure 2:
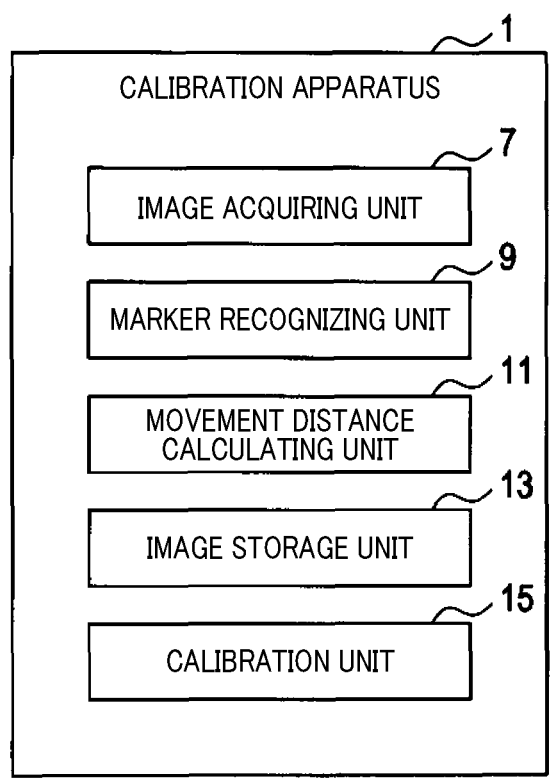
FIG. 2 is a block diagram of a functional configuration of the calibration apparatus.

As shown in FIG. 2, as a configuration of functions that are actualized by the CPU 3 running the program, the calibration apparatus 1 includes an image acquiring unit 7, a marker recognizing unit 9, a movement distance calculating unit 11, an image storage unit 13, and a calibration unit 15. A means for actualizing the foregoing elements that configure the calibration apparatus 1 is not limited to software. Some or all of the elements may be actualized through use of a single piece or a plurality of pieces of hardware. For example, when the above-described functions are actualized by an electronic circuit that is hardware, the electronic circuit may be actualized by a digital circuit that includes numerous logic circuits, an analog circuit, or a combination of a digital circuit and an analog circuit.

As shown in FIG. 1, the own vehicle includes a front camera 17, a right camera 19, a left camera 21, a rear camera 23, and a display apparatus 25, in addition to the calibration apparatus 1. The front camera 17, the right camera 19, the left camera 21, and the rear camera 23 correspond to an onboard camera.

Figure 3:
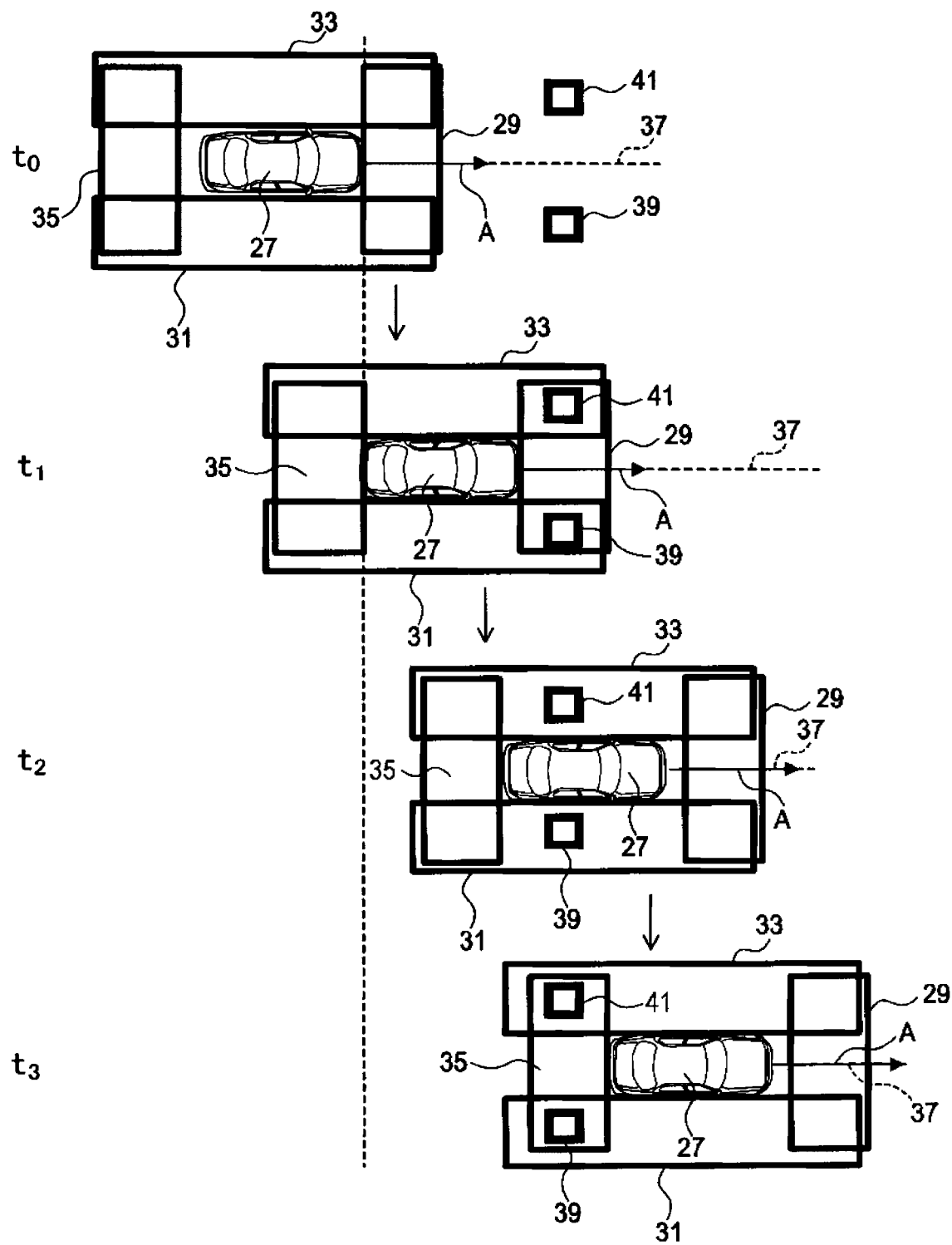
FIG. 3 is an explanatory diagram of positional relationships among markers, a front area, a right-side area, a left-side area, and a rear area.
Figure 4:
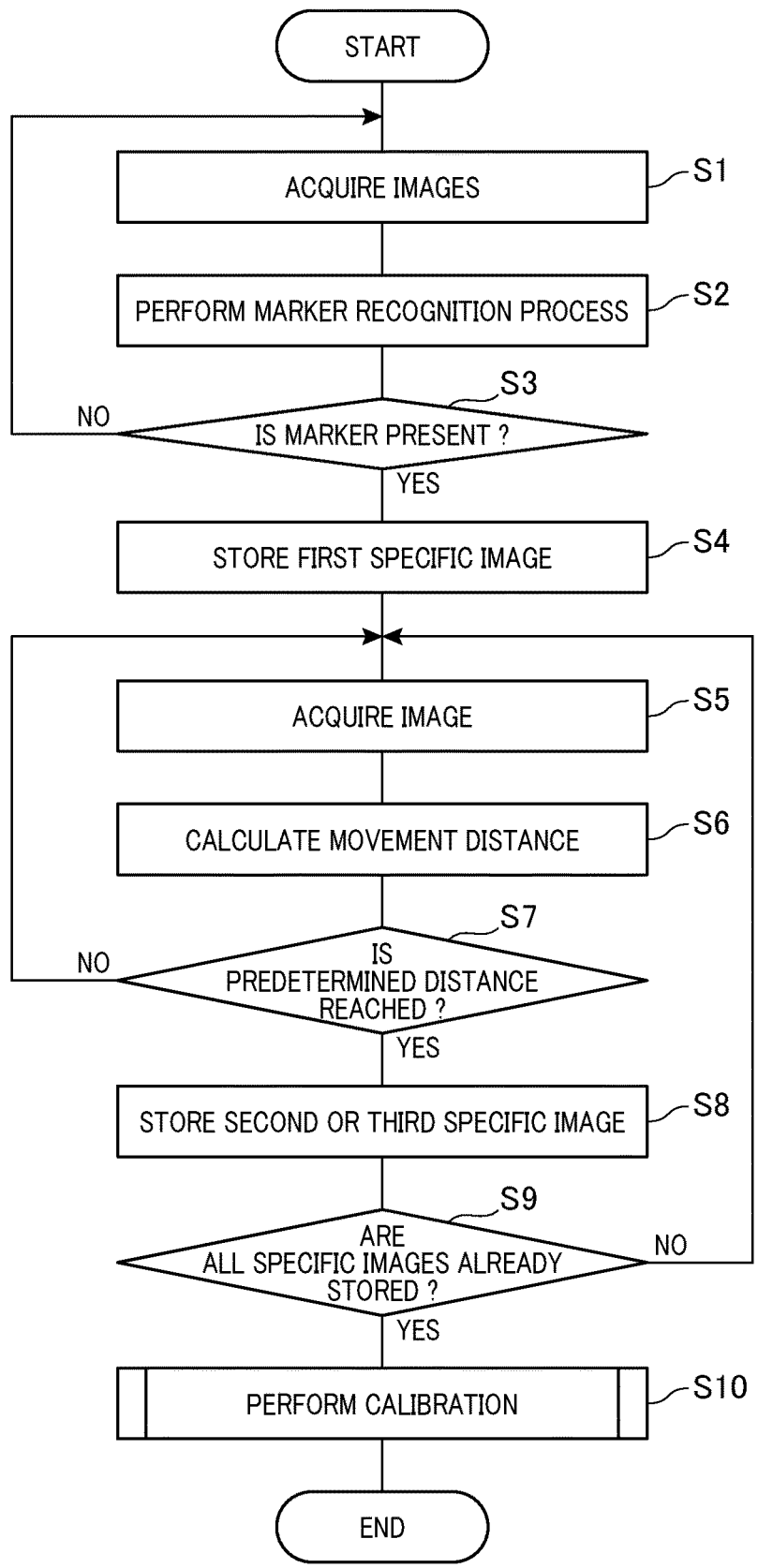
FIG. 4 is a flowchart of processes performed by the calibration apparatus.

As shown in FIG. 3, an image that is acquired by the front camera 17 is an image that captures an imaging area (hereinafter referred to as a front area 29) ahead of an own vehicle 27. As shown in FIG. 3, an image acquired by the right camera 19 is an image that captures an imaging area (referred to, hereinafter, as a right-side area 31) to the right of the own vehicle 27. As shown in FIG. 3, an image acquired by the left camera 21 is an image that captures an imaging area (referred to, hereinafter, as a left-side area 33) to the left of the own vehicle 27. As shown in FIG. 3, an image acquired by the rear camera 23 is an image that captures an imaging area (referred to, hereinafter, as a rear area 35) to the rear of the own vehicle 27.

Portions of the front area 29 respectively overlap with the right-side area 31 and the left-side area 33. In addition, portions of the rear area 35 respectively overlap with the right-side area 31 and the left-side area 33. The front camera 17 and the rear camera 23 correspond to a first onboard camera. The right camera 19 and the left camera 21 correspond to a second onboard camera. The display apparatus 25 displays an image based on a signal that is transmitted from the calibration apparatus 1.

2. Movement of the Own Vehicle 27, and Markers 39 and 41

Movement of the own vehicle 27 when a process described below is performed, and markers 39 and 41 will be described with reference to FIG. 3. When the process described below is performed, the own vehicle 27 moves in a fixed direction A along a movement path 37. The movement path 37 is a linear path. A longitudinal axis of the own vehicle 27 may be parallel with the movement path 37 or not be parallel with the movement path 37.

When the own vehicle 27 moves along the movement path 37, a direction of the longitudinal axis of the own vehicle 27 is fixed at all times. The own vehicle 27 may move along the movement path 37 by self-traveling or be carried along the movement path 37 by a conveyor unit such as a belt conveyor.

An aspect of the movement of the own vehicle 27 may be an aspect in which the own vehicle 27 continues moving at all times, or an aspect in which the own vehicle 27 repeatedly alternates between moving and stopping. In addition, a movement speed of the own vehicle 27 may be fixed or varied.

A pair of markers 39 and 41 is provided on a floor surface. For example, the markers 39 and 41 can be formed by paint being applied to the floor surface. The shape and size of the markers 39 and 41 are known values to the calibration apparatus 1. The shape of the markers 39 and 41 is a rectangle. Here, the shape of the markers 39 and 41 may be a shape other than a rectangle.

When the own vehicle 27 moves along the movement path 37, during at least any period, the markers 39 and 41 are included in any of the front area 29, the right-side area 31, the left-side area 33, and the rear area 35.

For example, at time to, the markers 39 and 41 are not included in any of the front area 29, the right-side area 31, the left-side area 33, and the rear area 35. However, subsequently, at time $t_1$, the marker 39 is included in the front area 29 and a portion of the right-side area 31 that is towards the front. In addition, at time $t_1$, the marker 41 is included in the front area 29 and a portion of the left-side area 33 that is towards the front.

The state at time $t_1$ is a state in which the marker 39 is included in an area in which the front area 29 and the right-side area 31 overlap, and the marker 41 is included in an area in which the front area 29 and the left-side area 33 overlap.

Subsequently, at time $t_2$, the marker 39 is included in a center portion of the right-side area 31. In addition, at time $t_2$, the marker 41 is included in a center portion of the left-side area 33. The center refers to the center in the direction of the movement path 37.

The position of the own vehicle 27 at time $t_2$ has advanced in direction A by a movement distance $L_{12}$, compared to the position at time $t_1$. Therefore, the positions of the markers 39 and 41 with reference to the right-side area 31 and the left-side area 33 at time $t_2$ have moved in a direction opposite direction A by the movement distance $L_{12}$, compared to the positions at time $t_1$.

Subsequently, at time $t_3$, the marker 39 is included in a portion of the right-side area 31 that is towards the rear, and the rear area 35. In addition, at time $t_3$, the marker 41 is included in a portion of the left-side area 33 that is towards the rear, and the rear area 35.

The state at time $t_3$ is a state in which the marker 39 is included in an area in which the right-side area 31 and the rear area 35 overlap, and the marker 41 is included in an area in which the left-side area 33 and the rear area 35 overlap.

The position of the own vehicle 27 at time $t_3$ has advanced in direction A by a movement distance $L_{23}$, compared to the position at time $t_2$. Therefore, the positions of the markers 39 and 41 with reference to the right-side area 31 and the left-side area 33 at time $t_3$ have moved in the direction opposite direction A by the movement distance $L_{23}$, compared to the positions at time $t_2$.

2. Processes Performed by the Calibration Apparatus 1

Processes performed by the calibration apparatus 1 will be described with reference to FIG. 3 to FIG. 14. At step S1 in FIG. 4, the image acquiring unit 7 simultaneously acquires images using the front camera 17, the right camera 19, and the left camera 21.

At step S2, the marker recognizing unit 9 performs a process to recognize the markers 39 and 41 in the image by the front camera 17 acquired at step S1. The process will be described with reference to FIG. 5. The marker recognizing unit 9 sets a portion of the image by the front camera 17 as a target detection area 43. The target detection area 43 has a width in which the markers 39 and 41 fit.

The marker recognizing unit 9 performs pattern matching while scanning in the target detection area 43. That is, the marker recognizing unit 9 searches for a pattern unique to the markers 39 and 41, along a scanning direction 45. The scanning direction 45 is parallel to a vehicle width direction. For example, the pattern unique to the markers 39 and 41 is a pattern in which a luminance change that is "black to white to black" is repeated twice in the scanning direction 45.

Figure 5:
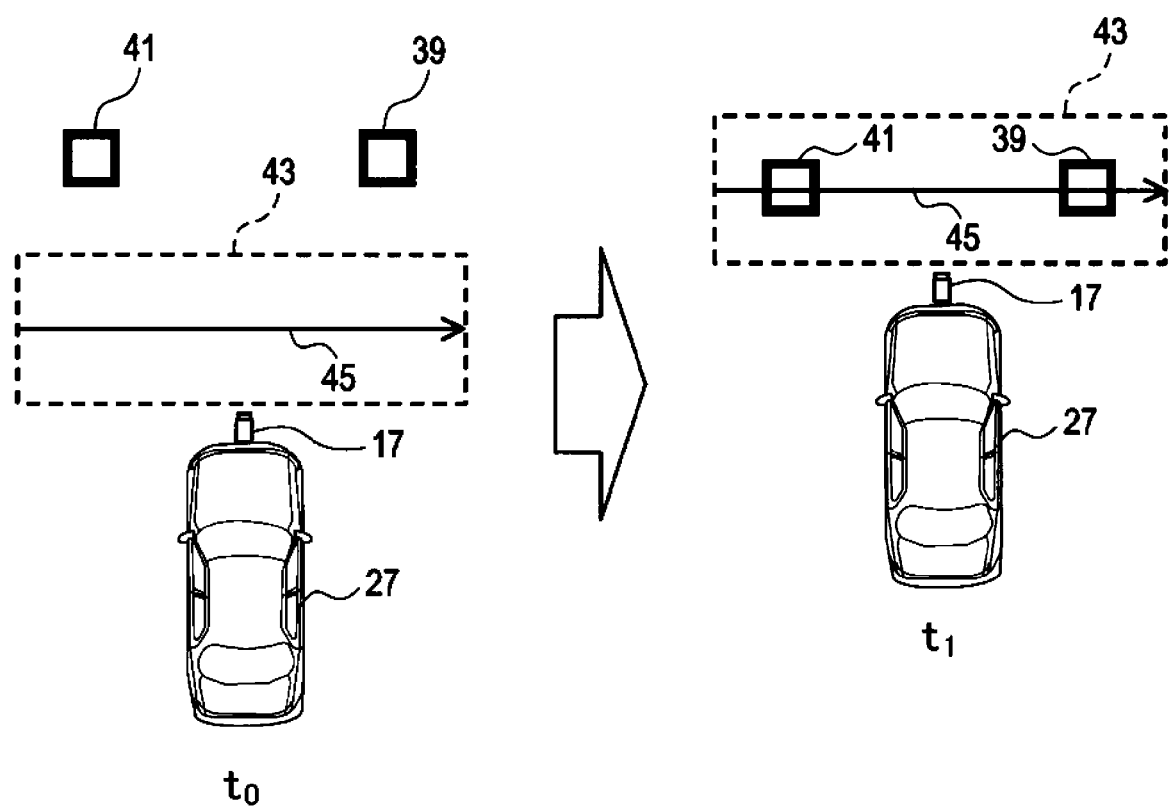
FIG. 5 is an explanatory diagram of a process for recognizing the markers.

When the markers 39 and 41 are not present in the target detection area 43, as in the state at time to shown in FIG. 5, the pattern unique to the markers 39 and 41 is not present, and the markers 39 and 41 cannot be recognized. When the markers 39 and 41 are present in the target detection area 43, as in the state at time $t_1$ shown in FIG. 5, the pattern unique to the markers 39 and 41 is present, and the markers 39 and 41 can be recognized.

Returning to FIG. 4, at step S3, the marker recognizing unit 9 determines whether the markers 39 and 41 are recognized at above-described step S2. When determined that the markers 39 and 41 are recognized, the marker recognizing unit 9 proceeds to step S4. When determined that the markers 39 and 41 are not recognized, the marker recognizing unit 9 returns to step S1.

At step S4, the image storage unit 13 stores the image that is acquired at step S1 and in which the markers 39 and 41 are recognized in the memory 5. The image that is stored at the present step is hereinafter referred to as a first specific image. The first specific image corresponds to a specific image. The first specific image is an image that includes the markers 39 and 41 therein. The first specific image includes an image captured by the front camera 17, an image captured by the right camera 19, and an image captured by the left camera 21. The first specific image is an image that is captured in the state at time $t_1$ shown in FIG. 3.

At step S5, the image acquiring unit 7 simultaneously acquires images using the front camera 17, the right camera 19, the left camera 21, and the rear camera 23.

At step S6, the movement distance calculating unit 111 calculates a movement distance L of the own vehicle 27. The movement distance L is a movement distance from the position of the own vehicle 27 when the newest specific image is acquired to the position of the own vehicle 27 at a current point. That is, when the first specific image is already acquired and a second specific image, described below, is not yet acquired, the movement distance L is a movement distance from the position of the own vehicle 27 when the first specific image is acquired to the position of the own vehicle 27 at the current point. In addition, when the second specific image is already acquired and a third specific image, described below, is not yet acquired, the movement distance L is a movement distance from the position of the own vehicle 27 when the second specific image is acquired to the position of the own vehicle 27 at the current point.

A method for calculating the movement distance L will be described with reference to FIG. 6. Steps S5 to S7 are repeatedly performed until an affirmative determination is made at step S7. An image 47 is acquired at each step S5 that is repeated. The image 47 is an image captured by the right camera 19.

The own vehicle 27 is moving in direction A. Therefore, as shown in FIG. 6, in accompaniment with this movement, the position of the marker 39 in the image 47 moves in the direction opposite direction A as the image 47 is that which is acquired later.

Figure 6:
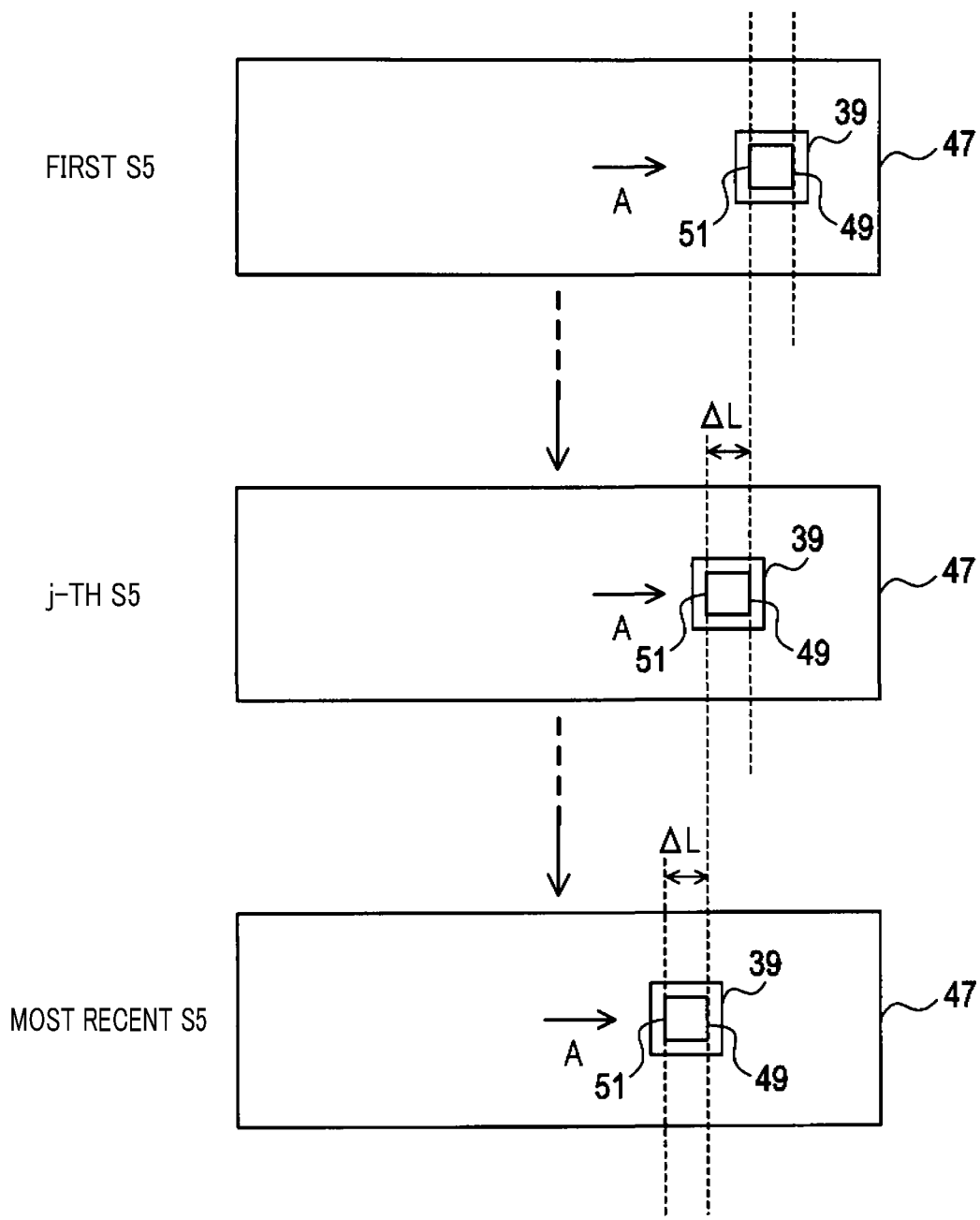
FIG. 6 is an explanatory diagram of a method for calculating movement distance.

As shown in FIG. 6, the movement distance calculating unit 11 recognizes the marker 39, a front side 49, and a rear side 51 in the image 47 acquired at each step S5. The front side 49 is a portion of an outline of the marker 39 that is on the direction A side. The rear side 51 is a portion of the outline of the marker 39 that is on the side opposite direction A. A distance in direction A from the front side 49 to the rear side 51 is $\Delta L$, and is a known value. The front side 49 corresponds to a first feature portion and the rear side 51 corresponds to a second feature portion.

Until the position of the marker 39 reaches the position in the image 47 acquired at the most recent step S5 from the position in the image 47 acquired at the first step S5, a process (hereinafter referred to as a unit distance movement process) in which the front side 49 in the image 47 acquired at a j-th step S5 moves to a position that overlaps the rear side 51 in the image 47 acquired at an i-th step S5 repeatedly occurs X times. In the example shown in FIG. 6, the front side 49 in the image 47 acquired at the j-th step S5 moves to the position that overlaps the rear side 51 in the image 47 acquired at the first step S5.

Here, j and i are both natural numbers, and j is greater than i. In addition, X is a natural number. The first step S5 is the step S5 that is performed immediately after step S4 is performed, or immediately after a negative determination is made at step S9, described below. A timing at which the first step S5 is performed corresponds to a timing at which a specific image has been acquired in the past. The i-th and j-th step S5 refer to an i-th step S5 and a j-th step S5 performed after step S4 is performed, or after a negative determination is made at step S9, described below.

From when the image 47 is acquired at the first step S5 until the image 47 is acquired at the most recent step S5, the marker 39 moves in the direction opposite direction A by a value obtained by $\Delta L$ being multiplied by X, in the image 47. This means that the position of the own vehicle 27 when the image 47 is acquired at the most recent step S5 has moved in direction A by the value obtained by $\Delta L$ being multiplied by X, compared to the position of the own vehicle 27 when the image 47 is acquired at the first step S5. That is, the value obtained by $\Delta L$ being multiplied by X corresponds to the movement distance L.

The movement distance calculating unit 11 calculates the movement distance L by determining above-described X using the images 47 acquired at each step S5 and multiplying $\Delta L$ with the determined X.

Returning to FIG. 4, at step S7, the image storage unit 13 determines whether the movement distance L calculated at step S6 has reached a predetermined distance. When the first specific image is already stored and the second specific image is not yet stored, the predetermined distance is $L_{12}$, described above. In addition, when the second specific image is already stored and the third specific image is not yet stored, the predetermined distance is $L_{23}$, described above. When the movement distance L has reached the predetermined distance, the image storage unit 13 proceeds to step S8. When the movement distance L has not reached the predetermined distance, the image storage unit 13 returns to step S5.

At step S8, the image storage unit 13 stores the image acquired at the most recent step S5 in the memory 5 as the specific image. When the specific image to be stored is a specific image to be stored following the first specific image, the specific image is the second specific image. The second specific image is an image that is captured in the state at time $t_2$ shown in FIG. 3. The second specific image includes an image captured by the right camera 19 and an image captured by the left camera 21.

In addition, when the specific image to be stored is a specific image to be stored following the second specific image, the specific image is the third specific image. The third specific image is an image that is captured in the state at time $t_3$ shown in FIG. 3. The third specific image includes an image captured by the right camera 19, an image captured by the left camera 21, and an image captured by the rear camera 23. The second specific image and the third specific image correspond to an image that is acquired when the position of the own vehicle when the specific image has been acquired in the past moves by the predetermined distance.

At step S9, the image storage unit 13 determines whether all of the first to third specific images are already stored. When all of the first to third specific images are already stored, the image storage unit 13 proceeds to step S10. When a specific image that is not yet stored is present, the image storage unit 13 returns to step S5.

Figure 7:
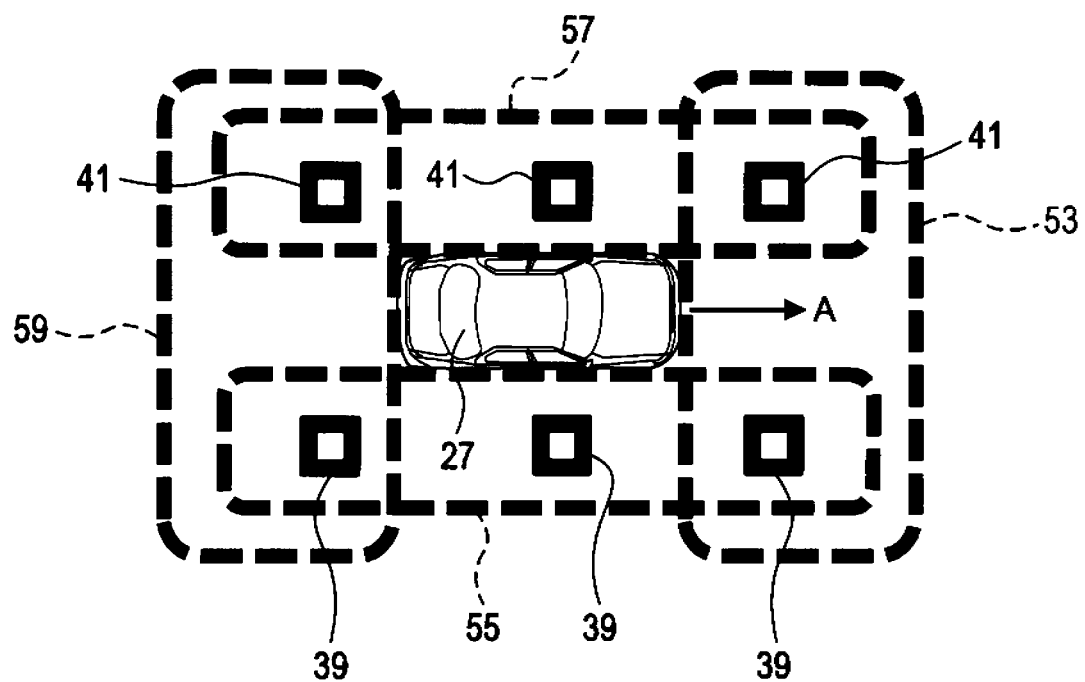
FIG. 7 is an explanatory diagram of images.

An image 53 by the front camera 17, an image 55 by the right camera 19, an image 57 by the left camera 21, and an image 59 by the rear camera 23 acquired by the first to third specific images are shown in FIG. 7. The image 53 includes the markers 39 and 41 in the first specific image. The image 55 and the image 57 respectively include the markers 39 and 41 in the first to third specific images. The image 59 includes the markers 39 and 41 in the third specific image.

Returning to FIG. 4, at step S10, calibration of the front camera 17, the right camera 19, the left camera 21, and the rear camera 23 is performed using the images 53, 55, 57, and 59. The calibration method is similar to a method disclosed in Japanese Patent Publication No. 4555876. An overview of the method will be described below.

Figure 8:
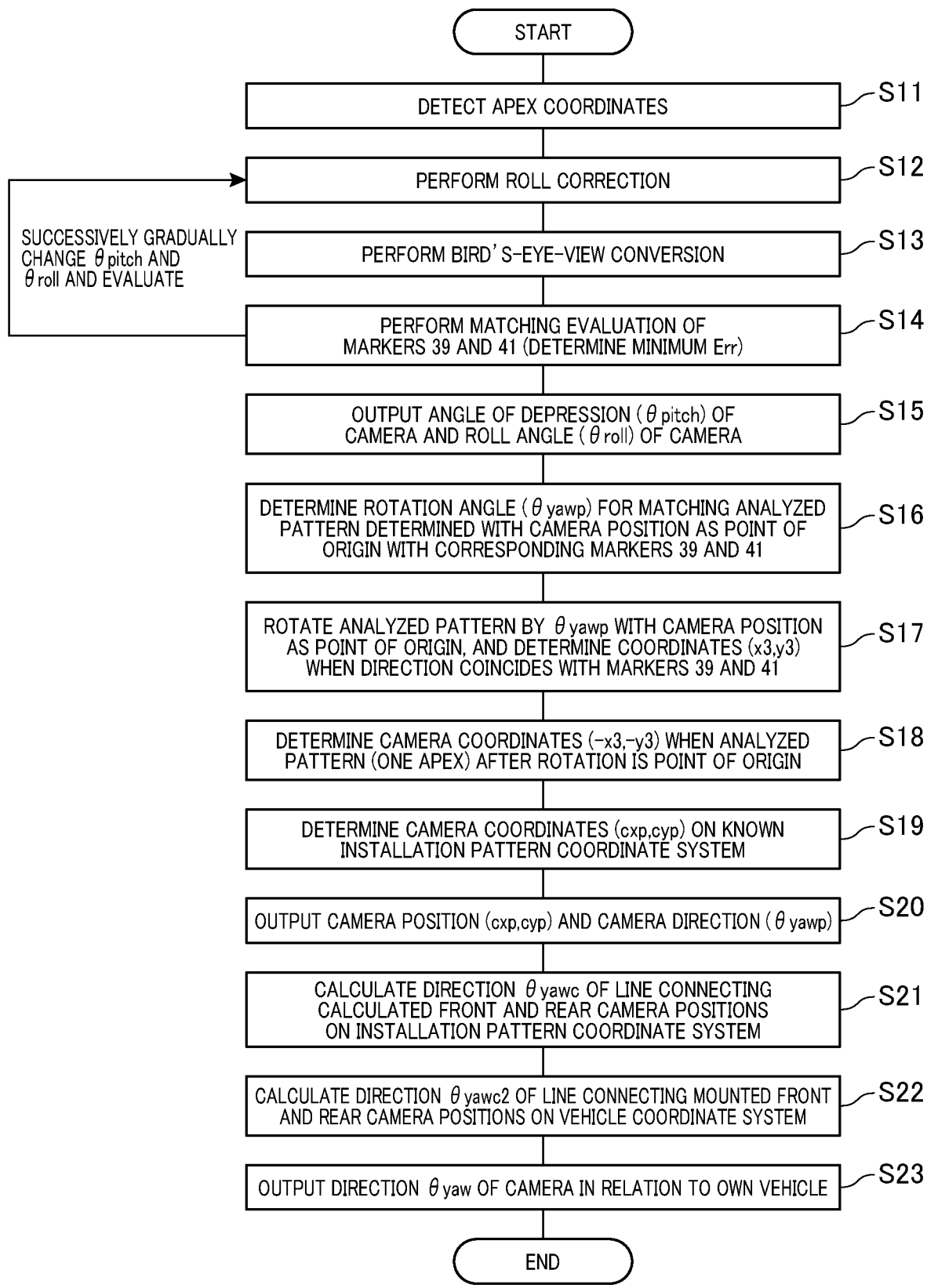
FIG. 8 is a flowchart of a calibration method.
Figure 9:
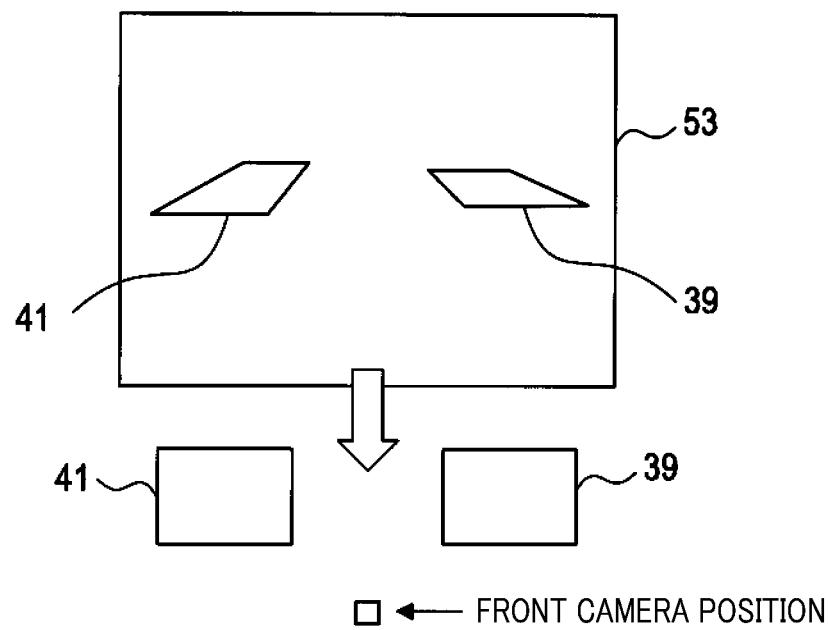
FIG. 9 is an explanatory diagram of an image captured by a front camera and coordinates of an analyzed pattern.

At step S11 in FIG. 8, two-dimensional coordinates of the markers 39 and 41 are detected from the image 53. That is, the coordinates $(x_0, y_0)$ of apexes in four locations of the markers 39 and 41 that are distorted quadrangles shown in FIG. 9 are detected.

Next, as a result of the processes at steps S12 to S14, described below, being repeated, in a manner described below, coordinates (hereinafter referred to as coordinates of an analyzed pattern) corresponding to the apexes of an original rectangle is determined from the coordinates of the apexes of the distorted quadrangle. In addition, an orientation of the front camera 17 relative to the analyzed pattern, that is, a depression angle $\theta_{pitch}$ and a roll angle $\theta_{roll}$ of the front camera 17 are determined.

Specifically, at step S12, coordinates $(x_1, y_1)$ after correction are determined from the two-dimensional coordinates $(x_0, y_0)$ of the apex as a result of roll correction being performed using expression 1, below. The roll correction is a correction of a rotation direction on an optical axis of the front camera 17.

[Formula 1]

$$\begin{bmatrix} x_1 \\ y_1 \end{bmatrix} = \begin{bmatrix} \cos\theta_{roll} & -\sin\theta_{roll} \\ \sin\theta_{roll} & \cos\theta_{roll} \end{bmatrix} \cdot \begin{bmatrix} x_0 \\ y_0 \end{bmatrix} \quad \text{(Expression 1)}$$

$$a = [(f \times \sin\theta_{pitch}) + y_1 \times \cos\theta_{pitch}] \quad \text{(Expression 2)}$$

$$x_2 = (x_1 \times H)/a$$

$$y_2 = [(f \times H \times \cos\theta_{pitch}) - (y_1 \times H \times \sin\theta_{pitch})]/a$$

$$Err = e1^2 + e2^2 + e3^2 + e4^2 \quad \text{(Expression 3)}$$

$$\begin{bmatrix} x_3 \\ y_3 \end{bmatrix} = \begin{bmatrix} \cos\theta_{yawp} & -\sin\theta_{yawp} \\ \sin\theta_{yawp} & \cos\theta_{yawp} \end{bmatrix} \cdot \begin{bmatrix} x_2 \\ y_2 \end{bmatrix} \quad \text{(Expression 4)}$$

$$\begin{bmatrix} cx_p \\ cy_p \end{bmatrix} = \begin{bmatrix} xp \\ yp \end{bmatrix} + \begin{bmatrix} -x_3 \\ -y_3 \end{bmatrix} \quad \text{(Expression 5)}$$

$$\theta_{yaw} = \theta_{yawp} + \theta_{yawc} + \theta_{yawc2} \quad \text{(Expression 6)}$$

At step S13, coordinates $(x_2, y_2)$ after bird's-eye-view conversion are determined from the coordinates $(x_1, y_1)$ after correction as a result of the bird's-eye-view conversion being performed through expression 2 using a predetermined depression angle θpitch. Here, in expression 2, above, f denotes camera focal length and H denotes camera height. The bird's-eye-view conversion refers to conversion to a bird's-eye-view image in which the floor surface on which the markers 39 and 41 are provided is viewed from above.

As shown in FIG. 9, the coordinates after bird's-eye-view conversion are the position of the analyzed pattern determined with the position of the front camera 17 as a point of origin.

Figure 10:
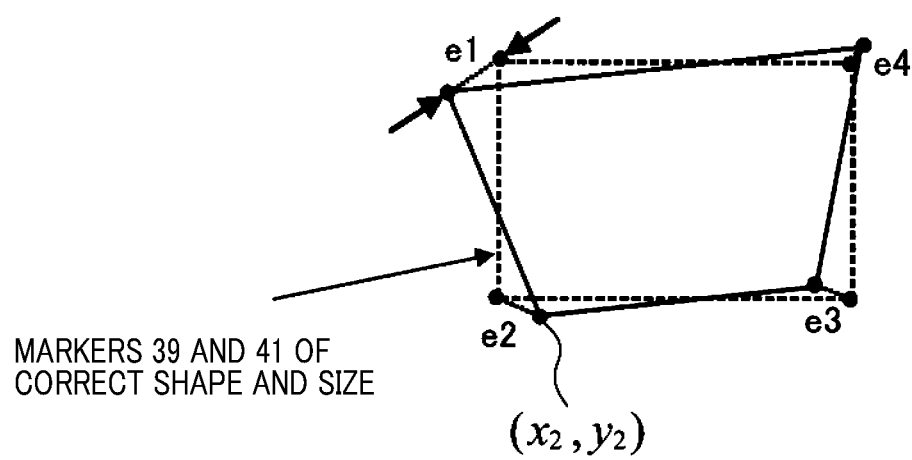
FIG. 10 is an explanatory diagram of a method for matching the markers.

At step S14, matching evaluation of the markers 39 and 41 is performed using expression 3. Specifically, for example, as shown in FIG. 10, respective errors e1 to e4 between the apexes $(x_2, y_2)$ of the markers 39 and 41 after bird's-eye-view conversion and the coordinates of the apexes of the markers 39 and 41 that have the original rectangular shape are determined. In addition, a sum Err of squares of the errors e1 to e4 is determined using expression 3.

That is, at steps S12 to S14, described above, a process to gradually change the roll angle θroll and the depression angle θpitch is successively repeated, and at this time, the roll angle θroll and the depression angle θpitch at which above-described Err is at minimum is determined.

Therefore, the orientation of the front camera 17 is known based on the determined roll angle θroll and depression angle θpitch. In addition, as a result of the determined roll angle θroll and depression angle θpitch being applied to expression 2, the position of the front camera 17 relative to the imaged markers 39 and 41 is determined.

The roll angle θroll and the depression angle θpitch are similarly determined for the right camera 19, the left camera 21, and the rear camera 23, as well.

At step S15, the depression angle θpitch and the roll angle θroll of each camera determined in the processes at steps S12 to S14 are outputted.

Figure 11:
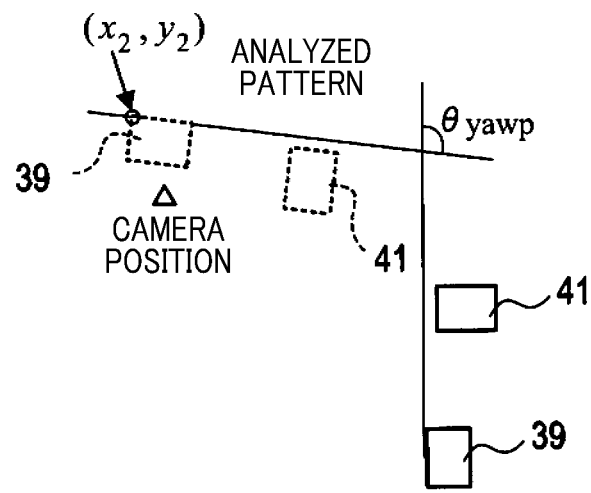
FIG. 11 is an explanatory diagram of a rotation angle for the analyzed pattern and the markers.

At step S16, as shown in FIG. 11, a rotation angle θyawp for matching the analyzed pattern that has been determined with the camera position as the point of origin with the corresponding markers 39 and 41 on the floor surface is determined. Here, for example, the rotation angle θyawp shown in FIG. 11 is an angle at which an extended line of a side on the outer side of the original marker 39 and an extended line of a side on the outer side of the marker 39 in the analyzed pattern position intersect.

Figure 12:
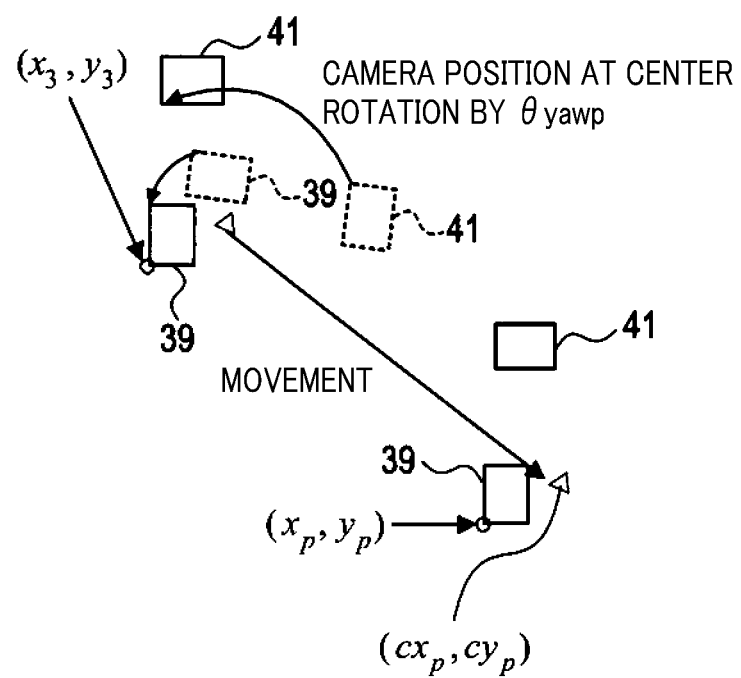
FIG. 12 is an explanatory diagram of a method for moving the analyzed pattern to an installation pattern coordinate system.

At step S17, as shown in FIG. 12, the analyzed pattern is rotated by the above-described rotation angle θyawp with the camera position as the point of origin, and coordinates $(x_3, y_3)$ when the direction coincides with the original markers 39 and 41 on the floor surface are determined.

At step S18, camera coordinates $(-x_3, -y_3)$ when an apex of the analyzed pattern after rotation is the point of origin are determined.

At step S19, camera coordinates $(c_{xp}, c_{yp})$ on a known installation pattern coordinate system are determined from the camera coordinates $(-x_3, -y_3)$ using expression 5. That is, the camera coordinates $(c_{xp}, c_{yp})$ on the installation pattern coordinate system are determined by parallel translation of the camera coordinates being performed in a manner shown in FIG. 12.

The installation pattern coordinate system is a coordinate system with reference to the floor surface. Here, $(x_p, y_p)$ in expression 5, above, is measured and acquired as coordinates on the installation pattern coordinate system when the markers 39 and 41 are formed on the floor surface.

Then, as a result of processes similar to those at above-described steps S16 to S19 being performed for each camera, the positional relationship between each camera and the markers 39 and 41 is determined.

At step S20, the camera coordinates $(c_{xp}, c_{yp})$ of the camera and the camera direction θyawp are outputted. The camera direction θyawp is identical to the rotation angle θyawp in FIG. 11 and FIG. 12.

Figure 13:
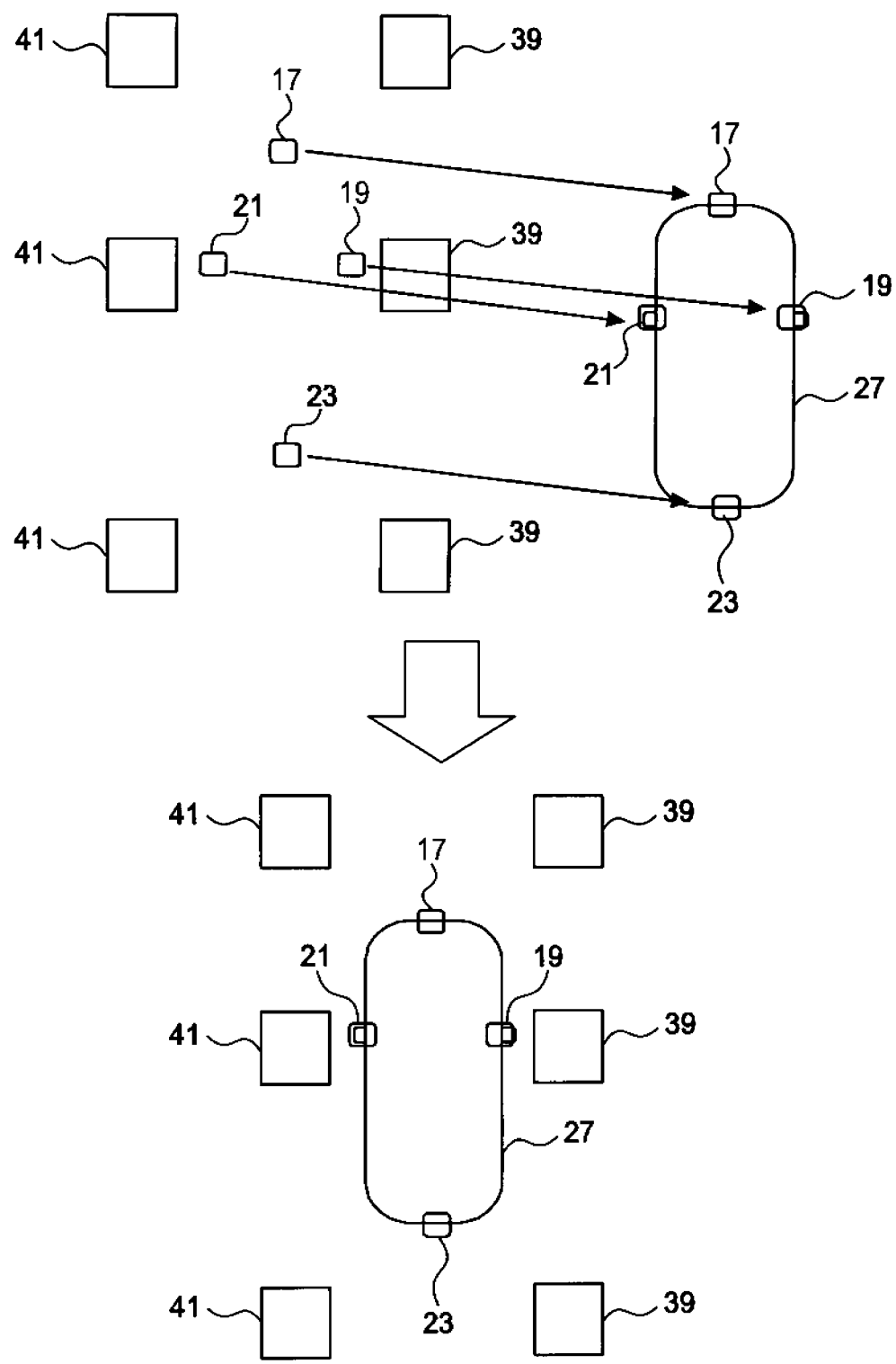
FIG. 13 is an explanatory diagram of a positional relationship between an own vehicle and the markers.

Therefore, in a manner shown in FIG. 13, as a result of the image of the markers 39 and 41 being moved such that the detected camera position and the actual camera position mounted in the own vehicle 27 coincide, and image composition being performed, the positional relationship between the own vehicle 27 and the markers 39 and 41 becomes clear. That is, the position and direction in which the own vehicle 27 is present relative to the markers 39 and 41 becomes known.

At steps S21 to S23 described below, a manner in which the direction of each camera relative to the own vehicle 27 is determined will be described with the front camera 17 being given as an example. The direction of each camera refers to the direction on a plane that is parallel to the floor surface.

Figure 14:
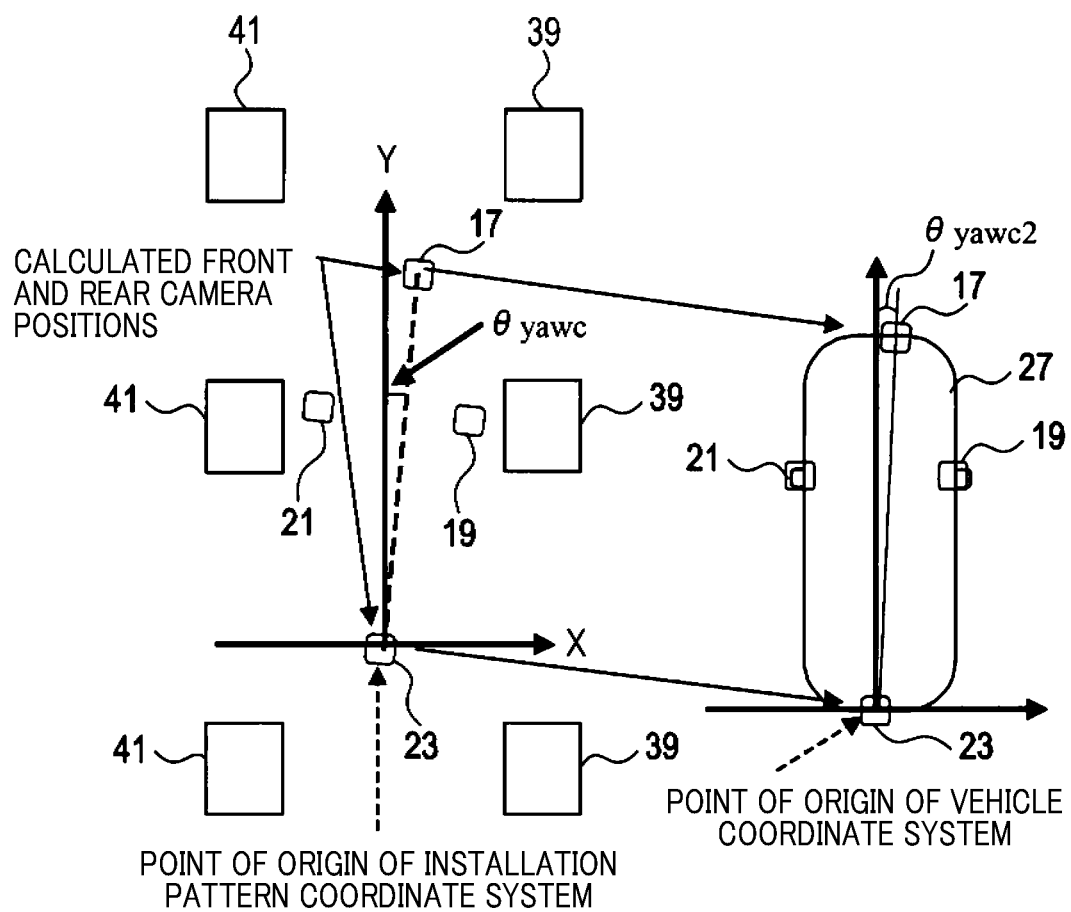
FIG. 14 is an explanatory diagram of a method for determining a direction of a camera.

Here, to facilitate understanding of the description, as shown in FIG. 14, an example will be described below in which an axis that connects the front camera 17 and the rear camera 23 is inclined relative to a Y axis of the installation pattern coordinate system, that is, θyawc is large.

At step S21, for example, a direction (hereinafter referred to as a first deviation angle θyawc) of a line that connects calculated front and rear camera positions on the installation pattern coordinate system is calculated. Here, the point of origin of the installation pattern coordinate system is moved upwards in the drawing by a predetermined distance.

At step S22, a direction (hereinafter referred to as a second deviation angle θyawc2) of the front and rear camera positions relative to a center line of the own vehicle 27 on the vehicle coordinate system is determined. When the front and rear cameras are on the center line, the second deviation angle θyawc2 is 0. Here, the vehicle coordinate system is a coordinate system in which the center of a rear end of the own vehicle 27 serves as the point of origin. The center line of the own vehicle 27 refers to a line that divides the own vehicle 27 with left-right symmetry.

At subsequent step S23, a direction θyaw of the front camera 17 on a horizontal plane relative to the own vehicle 27 is calculated using expression 6, above. Specifically, the direction θyaw of the front camera 17 relative to the own vehicle 27 is calculated by a calculation in which the first deviation angle θyawc and the second deviation angle θyawc2 are added to the rotation angle θyawp. Then, the direction θyaw is outputted, and the present process is temporarily ended.

Here, for example, the directions of the right camera 19, the left camera 21, and the rear camera 23 can also be similarly determined using the deviation relative to the Y axis of the installation pattern coordinate system. Therefore, descriptions thereof are omitted.

Therefore, according to the present embodiment, the attitude, that is, the depression angle θpitch, the roll angle θroll, and the direction θyaw of each camera relative to the own vehicle 27 can be determined by the processes described above. As a result, these values can be compared to design values for mounting each camera. For example, a drive apparatus (not shown) of each camera can be driven and adjustments can be made such that the values become the design values for mounting each camera.

4. Effects Achieved by the Calibration Apparatus 1

(1A) As a result of the calibration apparatus 1, an image including the markers 39 and 41 can be acquired for each of the front camera 17, the right camera 19, the left camera 21, and the rear camera 23. Therefore, a marker is not required to be formed on the floor surface in advance for the imaging areas of all of the cameras.

(1B) As shown in FIG. 7, the image 55 by the right camera 19 and the image 57 by the left camera 21 virtually include a plurality of markers. Therefore, compared to when a single marker is included, the accuracy of calibration can be improved.

(1C) The calibration apparatus 1 can accurately calculate the movement distances $L_{12}$ and $L_{23}$ of the own vehicle 27 based on the number of times that the process in which the front side 49 of the marker 39 moves to a position overlapping the rear side 52 in the image 47 in accompaniment with the movement of the own vehicle 27 is repeated. The movement distances $L_{12}$ and $L_{23}$ are the intervals of the markers 39 and 41 in direction A in the images 55 and 57 shown in FIG. 7. Therefore, the calibration apparatus 1 can accurately calculate the intervals of the markers 39 and 41 in direction A in the images 55 and 57. As a result, calibration based on the images 55 and 57 can be performed with further accuracy.

(1D) The calibration apparatus 1 can store the specific images and perform calibration for each of the front camera 17, the right camera 19, the left camera 21, and the rear camera 23.

(1E) As shown in FIG. 3, at time $t_1$, the calibration apparatus 1 performs imaging using the front camera 17, the right camera 19, and the left camera 21, in a state in which the marker 39 is included in the area in which the front area 29 and the right area 31 overlap, and the marker 41 is included in the area in which the front area 29 and the left area 33 overlap. Therefore, the direction θyaw can be determined for the front camera 17, the right camera 19, and the left camera 21.

In addition, at time $t_3$, the calibration apparatus 1 performs imaging using the right camera 19, the left camera 21, and the rear camera 23 in a state in which the marker 39 is included in the area in which the right-side area 31 and the rear area 35 overlap, and the marker 41 is included in the area in which the left-side area 33 and the rear area 35 overlap. Therefore, the direction θyaw can be determined for the right camera 19, the left camera 21, and the rear camera 23.

Other Embodiments

An embodiment of the present disclosure is described above. However, the present disclosure is not limited to the above-described embodiment and can be carried out with various modifications.

Figure 15:
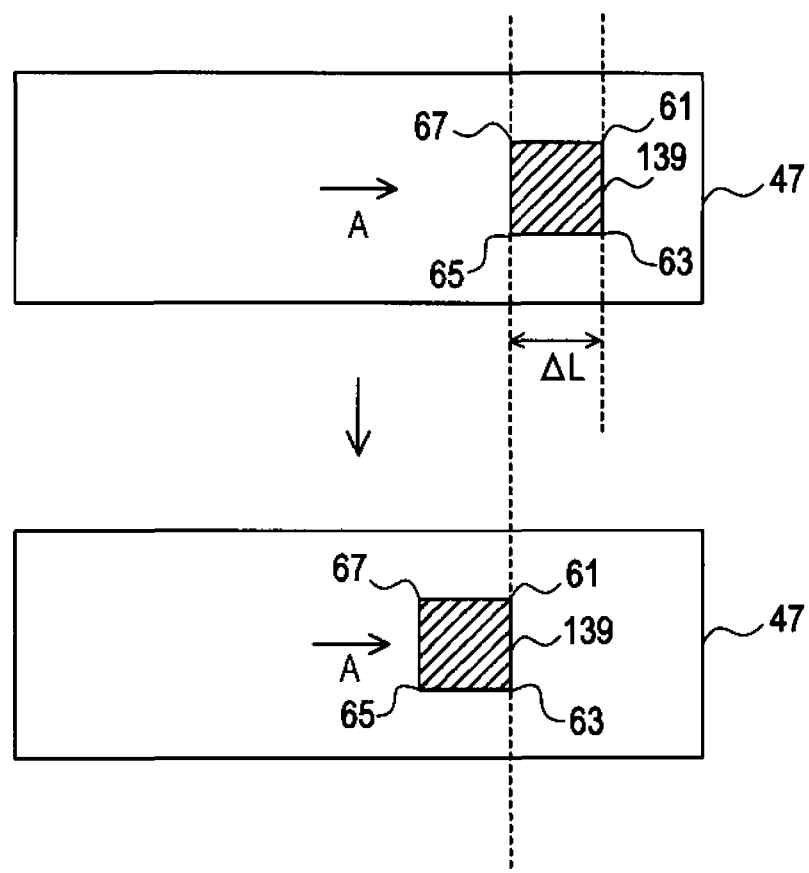
FIG. 15 is an explanatory diagram of a method for calculating movement distance.

(1) The method for calculating the movement distance L may be another method. For example, as shown in FIG. 15, the movement distance L may be calculated based on the number of times that a process in which an apex 61 of a marker 139 moves to a position overlapping an apex 67 and an apex 63 moves to a position overlapping an apex 65 in the image 47 in accompaniment with the movement of the own vehicle 27 in direction A is repeated. The apexes 61 and 63 are apexes of the marker 139 on the direction A side. The apexes 65 and 67 are apexes of the marker 139 on the side opposite direction A. A distance between the apex 61 and the apex 67 in direction A is a known value ΔL. In addition, a distance between the apex 63 and the apex 65 in direction A is also ΔL. The apexes 61 and 63 correspond to the first feature portion, and the apexes 65 and 67 correspond to the second feature portion.

Figure 16:
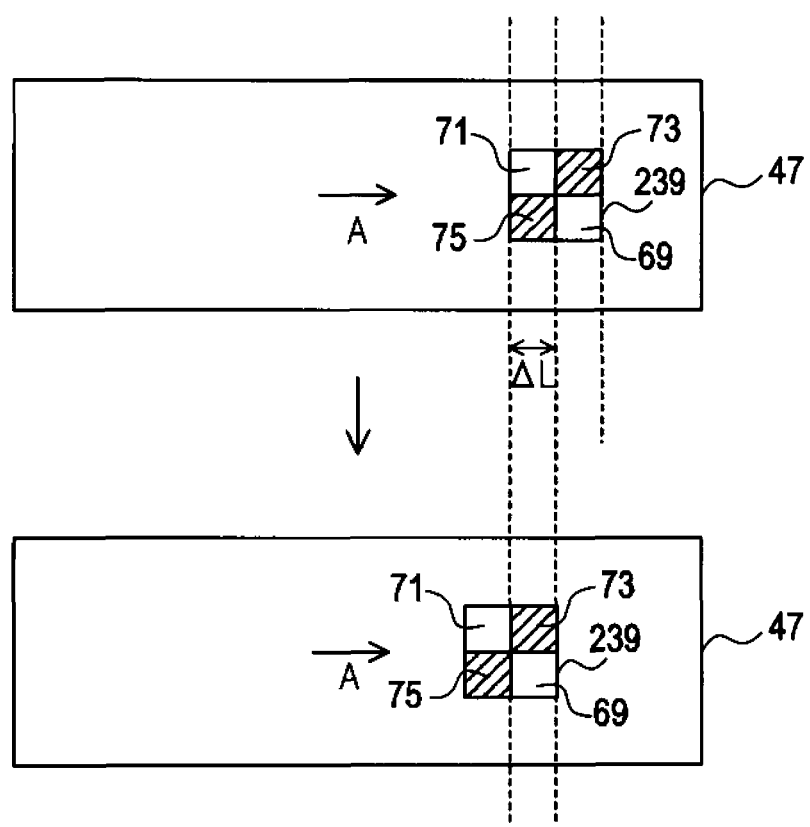
FIG. 16 is an explanatory diagram of a calculation method for movement distance.

(2) The method for calculating the movement distance L may be another method. For example, as shown in FIG. 16, a marker 239 has a checkerboard-like aspect in which square-shaped areas 69 and 71 that have high luminance and square-shaped areas 73 and 75 that have low luminance are combined. The size of each side of the areas 69, 71, 73, and 75 is the same and is a known value ΔL. The movement distance L may be calculated based on the number of times that a process in which the area 73 moves to a position overlapping the area 71 and the area 69 moves to a position overlapping the area 75 in accompaniment with the movement of the own vehicle 27 in direction A is repeated.

For example, the area 73 moving to the position overlapping the area 71 and the area 69 moving to the position overlapping the area 75 can be detected in a following manner. Luminance difference between pixels that are in the same position in the image 47 before movement and the image 47 after movement is calculated. Then, a sum of the absolute values of the luminance difference for each pixel is calculated. The sum of the absolute values becomes maximum when the area 73 moves to the position overlapping the area 71 and the area 69 moves to the position overlapping the area 75. Therefore, the area 73 having moved to the position overlapping the area 71 and the area 69 having moved to the position overlapping the area 75 can be detected based on the sum of the absolute values of the luminance difference. The areas 69 and 73 correspond to the first feature portion, and the areas 71 and 75 correspond to the second feature portion.

(3) The own vehicle 27 may not include one to three cameras among the first camera 17, the right camera 19, the left camera 21, and the rear camera 23. For example, the own vehicle 27 may include three cameras. As the three cameras, a combination of the front camera 17, the right camera 19, and the left camera 21, a combination of the right camera 19, the left camera 21, and the rear camera 23, a combination of the front camera 17, the left camera 21, and the rear camera 23, or a combination of the front camera 17, the right camera 19, and the rear camera 23 can be given.

In addition, the own vehicle 27 may include two cameras. As the two cameras, a combination of the front camera 17 and the right camera 19, a combination of the front camera 17 and the left camera 21, a combination of the right camera 19 and the rear camera 23, or a combination of the left camera 21 and the rear camera 23 can be given.

Furthermore, the own vehicle may include only one among the front camera 17, the right camera 19, the left camera 21, and the rear camera 23. Moreover, the own vehicle 27 may include even more cameras in addition to the front camera 17, the right camera 19, the left camera 21, and the rear camera 23. Calibration can be performed for the other cameras as well, in a manner similar to that for the front camera 17, the right camera 19, the left camera 21, and the rear camera 23.

Figure 17:
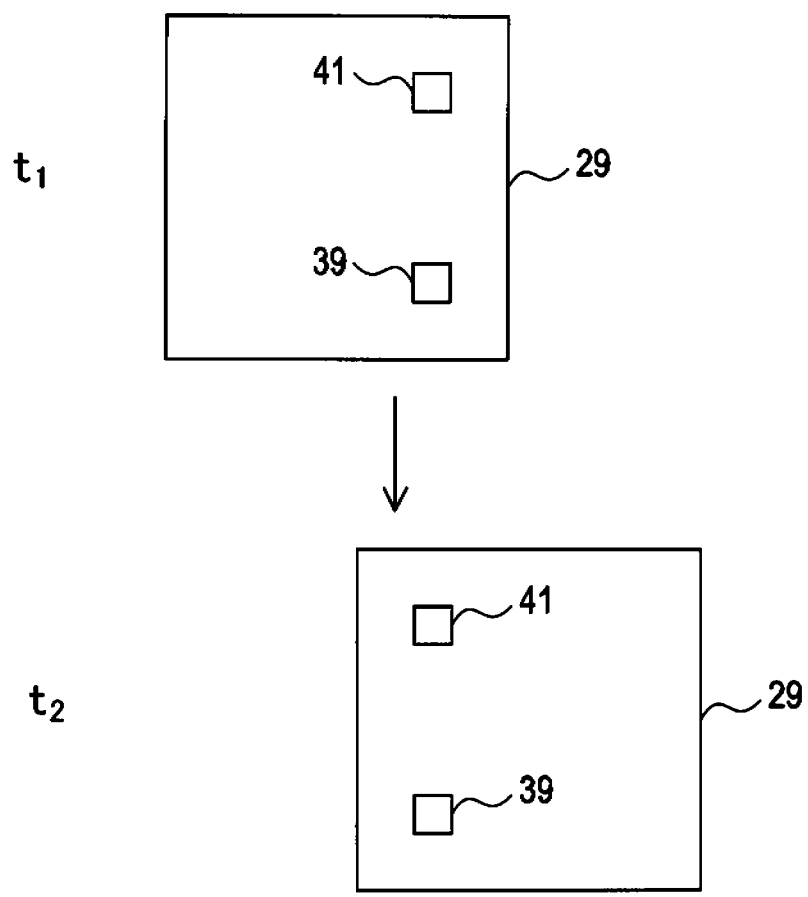
FIG. 17 is an explanatory diagram of a positional relationship between the markers when a first specific image and a second specific image are acquired, and the front area.
Figure 18:
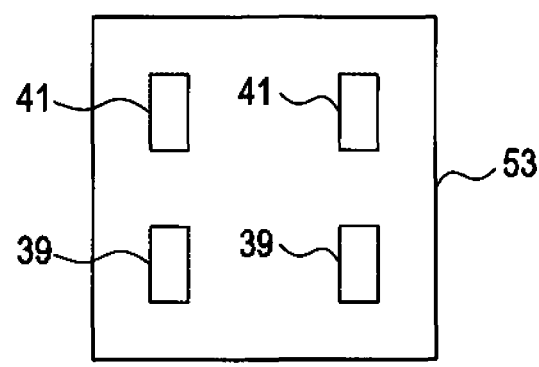
FIG. 18 is an explanatory diagram of the markers included in an image.

(4) As shown in FIG. 17, the markers 39 and 41 may be included in the front area 29 not only when the first specific image is acquired, but also when the second specific image is acquired. In this case, as shown in FIG. 18, the markers 39 and 41 in the first specific image and the markers 39 and 41 in the second specific image are virtually included in the image 53 acquired by the front camera 17. In this case, because the number of markers included in the image 53 increases, calibration of the front camera 17 can be performed with further accuracy.

In a similar manner, the markers 39 and 41 may be included in the rear area 35 not only when the third specific image is acquired, but also when the second specific image is acquired. In this case, as shown in FIG. 18, the markers 39 and 41 in the second specific image and the markers 39 and 41 in the third specific image are virtually included in the image 59 acquired by the rear camera 23. In this case, because the number of markers included in the image 59 increases, calibration of the rear camera 23 can be performed with further accuracy.

(5) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to an above-described embodiment may be added to or replace a configuration according to another of the above-described embodiments. Any mode included in the technical concept specified by the wordings of the scope of claims is an embodiment of the present disclosure.

(6) The present disclosure can also be actualized by various modes in addition to the above-described calibration apparatus 1, such as a system of which the calibration apparatus 1 is a constituent element, a program enabling a computer to function as the calibration apparatus 1, and a non-transitory computer-readable storage medium such as a semiconductor memory in which the program is recorded.

What is claimed is:

1. A calibration apparatus for an onboard camera comprising: an image acquiring unit that acquires an image using an onboard camera that is mounted to a vehicle; a marker recognizing unit that recognizes a marker that is provided on a floor surface in the image acquired by the image acquiring unit; a movement distance calculating unit that calculates a movement distance of the vehicle based on a number of times that a process in which a first feature portion in the marker moves to a position overlapping a second feature portion in the marker in the image acquired by the image acquiring unit in accompaniment with movement of the vehicle in a fixed direction is repeated; an image storage unit that stores a specific image that includes the marker, among the images acquired by the image acquiring unit; and a calibration unit that calibrates the onboard camera using the specific image stored by the image storage unit, wherein the image storage unit stores, as the specific image, (a) the image in which the marker recognizing unit recognizes the marker, and (b) the image acquired when the movement distance calculated by the movement distance calculating unit from a position of the vehicle when the specific image has been acquired in the past reaches a predetermined distance.

2. The calibration apparatus for an onboard camera according to claim 1, wherein: the image acquiring unit acquires the image from each of a plurality of onboard cameras; the image storage unit stores the specific image for each of the plurality of onboard cameras; and the calibration unit performs calibration for each of the plurality of onboard cameras.

3. The calibration apparatus for an onboard camera according to claim 2, wherein: a first onboard camera and a second onboard camera included in the plurality of onboard cameras have overlapping imaging areas; and the image storage unit stores, as the specific image, each of an image captured by the first onboard camera and an image captured by the second onboard camera that are simultaneously acquired in a state in which the marker is included in the overlapping imaging areas.

4. A calibration method for an onboard camera comprising:
   acquiring an image using an onboard camera that is mounted to a vehicle;
   recognizing a marker that is provided on a floor surface in the acquired image;
   calculating a movement distance of the vehicle based on a number of times that a process in which a first feature portion in the marker moves to a position overlapping a second feature portion in the marker in the acquired image in accompaniment with movement of the vehicle in a fixed direction is repeated;
   storing a specific image that includes the marker, among the acquired images; and
   calibrating the onboard camera using the stored specific image, wherein
   the specific image includes (a) the image in which the marker is recognized, and (b) the image acquired when the movement distance from a position of the vehicle when the specific image has been acquired in the past reaches a predetermined distance.

5. The calibration method for an onboard camera according to claim 4, wherein:
   the image is acquired from each of a plurality of onboard cameras;
   the specific image is stored for each of the plurality of onboard cameras; and
   calibration is performed for each of the plurality of onboard cameras.

6. The calibration method for an onboard camera according to claim 5, wherein:
   a first onboard camera and a second onboard camera included in the plurality of onboard cameras have overlapping imaging areas; and the specific image includes an image captured by the first onboard camera and an image captured by the second onboard camera that are simultaneously acquired in a state in which the marker is included in the overlapping imaging areas.

* * * * *